United States Patent
Gherren Noel et al.

(10) Patent No.: US 12,221,855 B2
(45) Date of Patent: Feb. 11, 2025

(54) ELECTROMAGNETIC-MECHANICAL LOCKING DEVICE APPLIED TO SUBSURFACE SAFETY VALVE

(71) Applicant: OURO NEGRO TECNOLOGIAS EM EQUIPAMENTOS INDUSTRIAIS S/A, Rio de Janeiro (BR)

(72) Inventors: Felipe Gherren Noel, Petropolis (BR); Giancarlo Vilela De Faria, Rio de Janeiro (BR); Leonardo Gonçalves Candido Gomes, Rio de Janeiro (BR); Ricardo Naoyuki Alves De Moraes Sawaguchi, Rio de Janeiro (BR)

(73) Assignee: Ouro Negro Tecnologias Em Equipamentos Industriais S/A, Rio de Janeiro (BR)

( * ) Notice: Subject to any disclaimer, the term of this patent is extended or adjusted under 35 U.S.C. 154(b) by 67 days.

(21) Appl. No.: 18/013,068

(22) PCT Filed: Jun. 29, 2021

(86) PCT No.: PCT/BR2021/050286
§ 371 (c)(1),
(2) Date: Dec. 27, 2022

(87) PCT Pub. No.: WO2022/000062
PCT Pub. Date: Jan. 6, 2022

(65) Prior Publication Data
US 2023/0332483 A1   Oct. 19, 2023

(30) Foreign Application Priority Data
Jun. 30, 2020 (BR) .................... BR102020013476-0

(51) Int. Cl.
 E21B 34/06   (2006.01)
 F16K 31/04   (2006.01)
 F16K 31/06   (2006.01)

(52) U.S. Cl.
 CPC ............ E21B 34/066 (2013.01); F16K 31/04 (2013.01); F16K 31/06 (2013.01)

(58) Field of Classification Search
 CPC ......... E21B 34/066; F16K 31/04; F16K 31/06
 See application file for complete search history.

(56) References Cited

U.S. PATENT DOCUMENTS

| | | | | |
|---|---|---|---|---|
| 4,796,708 A | * | 1/1989 | Lembcke | ................ E21B 47/13 340/853.3 |
| 5,226,483 A | | 7/1993 | Otis | |

(Continued)

*Primary Examiner* — Shane Bomar
(74) *Attorney, Agent, or Firm* — Dale Paul DiMaggio; Malin Haley DiMaggio & Bowen, PA (57) ABSTRACT

An electromagnetic-mechanical locking device applied to a subsurface safety valve comprising an electromagnetic-mechanical coupler formed electromagnet (4), ferromagnetic bulkhead (5) in solidarity to the mobile part (6), actuated by spring (9), in addition to locking element (7), and when activated, the electromagnet (4) creates a magnetic field that attracts the ferromagnetic bulkhead (5), along with the mobile part (6), moving this set towards the electromagnet (4), and compressing the locking element (7). During the movement, the mobile part (6) shifts the locking element (7) to the locking position, until it reaches its coupling on the flow tube (3), where it is maintained with compression locking element (7), configuring a trigger device. When the power supplied to the electromagnet (4) ceases, the electromagnetic attraction force of the ferromagnetic bulkhead (5) is cancelled, and the locking element (7), until then retracted, is distended, causing the return of the mobile part (6) to initial position.

11 Claims, 5 Drawing Sheets

(56) References Cited

U.S. PATENT DOCUMENTS

| | | | | |
|---|---|---|---|---|
| 5,579,283 A * | 11/1996 | Owens | ............... | E21B 34/102 |
| | | | | 175/48 |
| 7,640,989 B2 * | 1/2010 | Williamson, Jr. | .... | E21B 34/066 |
| | | | | 166/66.5 |
| 8,424,842 B2 | 4/2013 | Bussear | | |
| 10,724,332 B2 * | 7/2020 | Henschel, Jr. | ........ | E21B 34/066 |
| 11,248,441 B2 * | 2/2022 | Vick, Jr. | ............... | E21B 34/066 |
| 2009/0206290 A1 * | 8/2009 | Wygnanski | ........... | F16K 31/047 |
| | | | | 251/129.15 |
| 2014/0060803 A1 * | 3/2014 | Gano | ................... | E21B 34/066 |
| | | | | 166/66.5 |
| 2019/0203564 A1 * | 7/2019 | Henschel, Jr. | ........ | E21B 34/066 |
| 2021/0140559 A1 * | 5/2021 | Giordano | ............. | F16K 39/022 |
| 2024/0076955 A1 * | 3/2024 | Chin | .................... | E21B 34/066 |

* cited by examiner

Detail B - Figure 4

Detail A - Figure 3

ELECTROMAGNETIC-MECHANICAL LOCKING DEVICE APPLIED TO SUBSURFACE SAFETY VALVE

FIELD OF APPLICATION

Patent of invention specification of electromagnetic-mechanical locking of the electromechanical coupling between the actuation means and the flow restriction means of a subsurface safety valve, which will ensure safe closure in case of a failure event, increasing its degree of reliability.

SUMMARY OF THE INVENTION

In order to meet the minimum safety requirements in oil wells, it is common for projects to include a safety valve installed in the production tubing, immediately below the well head.

This valve is a protective equipment that in the event of failures or accidents that may make inoperable the production equipment, located both in the well head and on the surface, is intended to prevent the uncontrolled leakage of fluids out of the well, preventing contamination of the environment, and providing safety to operations on the surface.

According to guidelines of regulatory agencies, for any and all surgent wells, the presence of at least two independent barrier solidarity sets (CSB) against leaks is necessary, and the subsurface safety valve (eSSV) is an integral component of the first CSB.

Currently, the vast majority of subsurface safety valves installed in oil production tubings are hydraulically operated, remotely, through a drive means composed of a hydraulic power unit (HPU) and two control lines, the second line acting in redundancy to the first (main) line.

The subsurface safety valve is hydraulically actuated, its functionality consisting of applying pressure to a hydraulic piston, fixed to the flow tube, which is actuated in opposition to the return means.

By applying hydraulic pressure to the main control line, the flow tube is pushed, and promotes the opening of the flow shutter element (flapper), and by ceasing the pressure, by failure, accident or command, the valve returns to its initial closing state by means of the spring actuation, or any other return device.

When pressurized, the piston moves in the direction of opening the valve, shifting the flow tube on which it is fastened, and compressing the return means, which in turn absorbs energy, and with the displacement of the flow tube, the valve flow shutter is articulated, with compression of its means of return, which also absorbs energy, changing the condition of the valve, which moves from the closed position to the open position, allowing the flow to pass through the production tubing.

By ceasing the hydraulic actuation power of the valve, the return means, previously compressed, distends, promoting the return of the piston and the flow tube, closing the valve flow shutter, interrupting the flow by the production tubing.

BACKGROUND OF THE ART

The subsurface safety valves have a high number of failures, most of them in the hydraulic actuation means, by clogging or leaks in the control line, in the piston chamber, or in the piston itself.

Failures of this kind cause great damage to the production chain, besides generating high risks to the safety of the surrounding environment.

It is common to find subsurface safety valves with secondary locking devices, called collets.

Secondary locking devices, when actuated, allow a reduction in the power required to maintain the valve in the open position, acting as mechanical triggers, providing the necessary force for this purpose.

When the power supply is interrupted for any reason, the trigger by itself will not be able to maintain the connection, allowing the means of return to act, causing the valve to close.

Several types of collet devices used for locking subsurface safety valves are known, varying in accordance to the valve construction, locking means, and the actuation means thereof.

The use of collets is commonplace in other oil well equipment, in addition to subsurface safety valves, such as, for example, in packers and flow control valves, among others, and in all cases are used in locking in a given position, as long as power supply is available.

The functionality of the trigger device (collet) varies according to the dynamics required by the equipment where it is employed, such as the available space, and its means of actuation; however, it is very common to see the use of spring-driven locking means that, together with movable elements, perform movement specific to its purpose.

There are also several means of actuation of collets, the most common being those employed in mechanical actuation subsurface safety valves, whereby the flow tube is shifted to the opening position, while compressing the return means and shifting the collet to the locking position, where it is maintained with a power lower than that of the actuation.

Electrically actuated collets are also known, such as the one described in patent document U.S. Pat. No. 5,070,944, which teaches a well-bottom safety valve that employs electric actuation means, also in conjunction with the electric collet.

The collet of document U.S. Pat. No. 5,070,944 is electrically actuated, by means of solenoids, which, when de-energized, release the actuation means that, by the action of springs, releases the means of return and closes the valve, with consequent interruption of production.

The well-bottom safety valve of document U.S. Pat. No. 5,070,944 employs a hollow-shaft electric motor whose rotating motion is converted, by thread connections, into axial movement of the flow tube, for opening and closing the valve flow shutter.

The well-bottom safety valve flow tube of document U.S. Pat. No. 5,070,944 has threads in its outer diameter, which are coupled to a sleeve that, by action of the hollow shaft motor, rotates in relation to said flow tube, without causing the axial movement of the flow tube, until it reaches the end-of-stroke position of the flow tube thread, where the sleeve will be at the height of the collets, which couple to solenoids that, while activated, compress lower springs, fixing the collets on the flow tube, preventing their axial movement, and with the continuity of the activation of the electric motor with hollow shaft, the flow tube is rotated, without axial movement relative to the flow tube, which begins to transfer to the opening of the valve flow shutter.

In document U.S. Pat. No. 5,070,944, by the time the flow tube reaches the full opening position of the valve flow shutter, the hollow shaft electric motor is turned off, and the flow tube will be in the start-of-stroke position of the flow tube thread, compressing the springs responsible for its return in case of failure or the need for valve closure.

In document U.S. Pat. No. 5,070,944, for the closing of the valve flow shutter, from the de-energization of the solenoids, the axial locking of the flow tube by the collets is disabled and, by action of the lower springs of the solenoids, the flow tube is returned, by the action of its springs, closing the valve flow shutter.

The main drawback of the well-bottom safety valve in document U.S. Pat. No. 5,070,944 refers to the fact that, by ceasing the power supply by failure, in view of the inoperability of the hollow shaft electric motor, the relative position between the sliding flow tube and the chestnut is maintained, which may lead to the impediment of the safe closing of the valve flapper.

Another drawback of the well-bottom safety valve of document U.S. Pat. No. 5,070,944 refers to the fact that it employs a large number of mechanical components in the transmission of movement, which generates several points of friction, with inefficient mechanical performance, consuming more energy, with a lower degree of operational reliability.

The difference between the valve of the present invention in relation to the valve of the document from the state of the art is verified in the transmission of the rotary movement, provided by the hollow shaft electric motor, for the axial movement of the flow tube, and in the means of coupling and uncoupling thereof, which ensures the quick and safe closing of the valve flow shutter.

FUNDAMENTS OF THE INVENTION

The present invention proposes to incorporate an electromagnetic-mechanical coupler into a subsurface safety valve for mechanical locking between the means of operation and flow control, allowing immediate disconnection thereof, when the interruption of the power supply, with the return means acting directly on the means of flow restriction, for the complete decoupling of the actuation means, providing a more efficient and reliable operation.

The replacement of the traditional hydraulic drive of the subsurface safety valves, by electromagnetic-mechanical drive, proposed by the present invention, offers greater operational safety, in addition to reducing the costs related to the infrastructure required for its operation.

The applicant, aligned with the interests of the oil and gas industry, and in line with technological advances in the area, proposes the electromagnetic-mechanical locking of the subsurface safety valve, by incorporating an electromagnetic-mechanical coupler formed by an electromagnet and a ferromagnetic bulkhead, the latter in solidarity with a mobile part, actuated by spring, and with locking element.

When activated, the electromagnet creates a magnetic field that attracts the ferromagnetic bulkhead, along with the mobile part, moving the assembly toward the electromagnet, and compressing the spring.

During this movement the mobile part moves the locking element to the locking position, which is achieved upon coupling thereof to the flow tube, where it is maintained, with spring compression, configuring a trigger device.

When the power supplied to the electromagnet ceases, the electromagnetic attraction force of the ferromagnetic bulkhead is cancelled, and the spring, until then retracted in the locked position, is distended, allowing the return of the mobile part to the initial position, leaving the locking element free, which causes the uncoupling of the flow tube.

The electromagnetic-mechanical coupler acts in conjunction with the flow tube, and is directly responsible for the compression of the valve return means, which consists of at least one spring, which provides the valve return to the closed position, blocking the production tubing.

In the locking of the subsurface safety valve of the present invention, the rotation movement of the hollow shaft motor that, through mechanical connection, rotates the sleeve and allows it to move axially in relation to the flow tube, is transmitted to said flow tube by action of the electromagnet of the electromagnetic-mechanical coupler, which, energized, approximates the ferromagnetic bulkhead, which in turn, shifts the locking element, which can be a sphere or any other element with geometry suitable for this application, until it fits into the proper cavity provided for in the flow tube.

The coupling of at least one locking element in at least one flow tube cavity is obtained by shifting the mobile piece in solidarity to the ferromagnetic bulkhead.

If the valve is needed to be closed quickly, the electromagnet is de-energized, the locking element disengages from the flow tube cavity, and the spring of the mobile part distends, moving the flow tube to its initial position.

The applicant has proposed patent BR102017012026-0, incorporated here by reference, which claims electric actuation subsurface safety valve, which requires constant energization from the hollow shaft motor, and the return spring of the set formed by the flow tube and sleeve must be able to move the hollow shaft motor in the opposite direction, for the safe closing of the valve flow shutter.

The subsurface safety valve of patent BR102017012026-0 can be adapted to act with the electromagnetic-mechanical coupler of the present invention.

The electromagnetic-mechanical coupler of the present invention, applied to the valve of patent BR102017012026-0, will perform the coupling of the flow control means with the valve actuation means, which incorporates a hollow shaft motor, acting in conjunction with a hollow shaft ball spindle, as claimed in patent BR102017012026-0.

Operationally the ball spindle, which in its initial position is fully distended, collects, when actuated by the hollow shaft electric motor, up to the position of coupling to the flow tube, indicated by stops and sensors, where the electromagnetic-mechanical coupler of the present invention is activated performing the coupling between the actuation means and the flow control means.

Joined by the electromagnetic-mechanical coupler, the actuation means is commanded to the opening position, from the fully extended ball spindle, causing the flow tube to move, compressing the return means, and opening the valve flow shutter.

In the opening position of the valve flow shutter, the actuation means is disabled, the ball spindle remains static, due to the self-locking condition imposed by the torque/axial force ratio, and with the electromagnetic-mechanical coupler energized, maintaining the coupling between the ball spindle and the flow tube.

It is worth noting that the power consumption to keep the electromagnetic-mechanical coupler actuated is residual (minimum), compared to the power consumption required for flow tube movement.

The interruption of the power supply to the electromagnet of the electromagnetic-mechanical coupler, due to failure, accident or command, releases the trigger device, the spring returning to the distended position, shifting the mobile part, the locking element of the flow tube cavity undocked.

Undocking the locking element from the locking cavity of the flow tube allows the uncoupling between the actuation means and the flow tube.

When uncoupled from the actuation means, the flow tube is shifted by the action of the return means, allowing the closing of the flow shutter of the subsurface safety valve by the valve flow shutter, physically blocking the production tubing.

BRIEF DESCRIPTION OF THE DRAWINGS

For a better understanding of the electromagnetic-mechanical locking applied to the subsurface safety valve now proposed, reference is made to the accompanying drawings, so that it can be reproduced by appropriate technique, particularizing its functionality, the drawings being merely illustrative, and may vary within the inventive principle of the present invention, and where.

PREFERRED DESCRIPTION OF THE INVENTION

Figure 1:
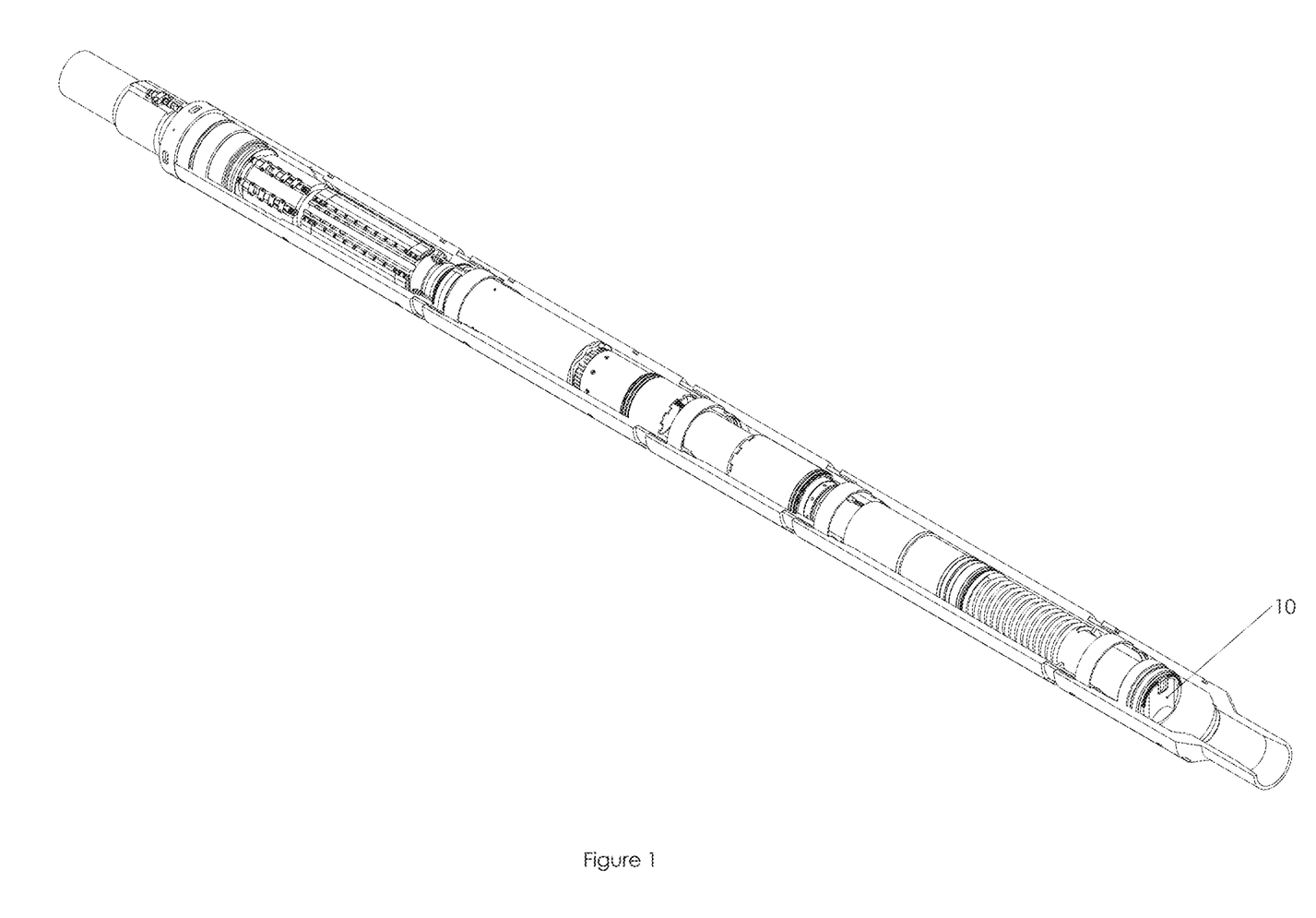
FIG. 1 illustrates a perspective view of a subsurface safety valve incorporating the electromagnetic-mechanical locking of the present invention, in the closed position.
Figure 2:
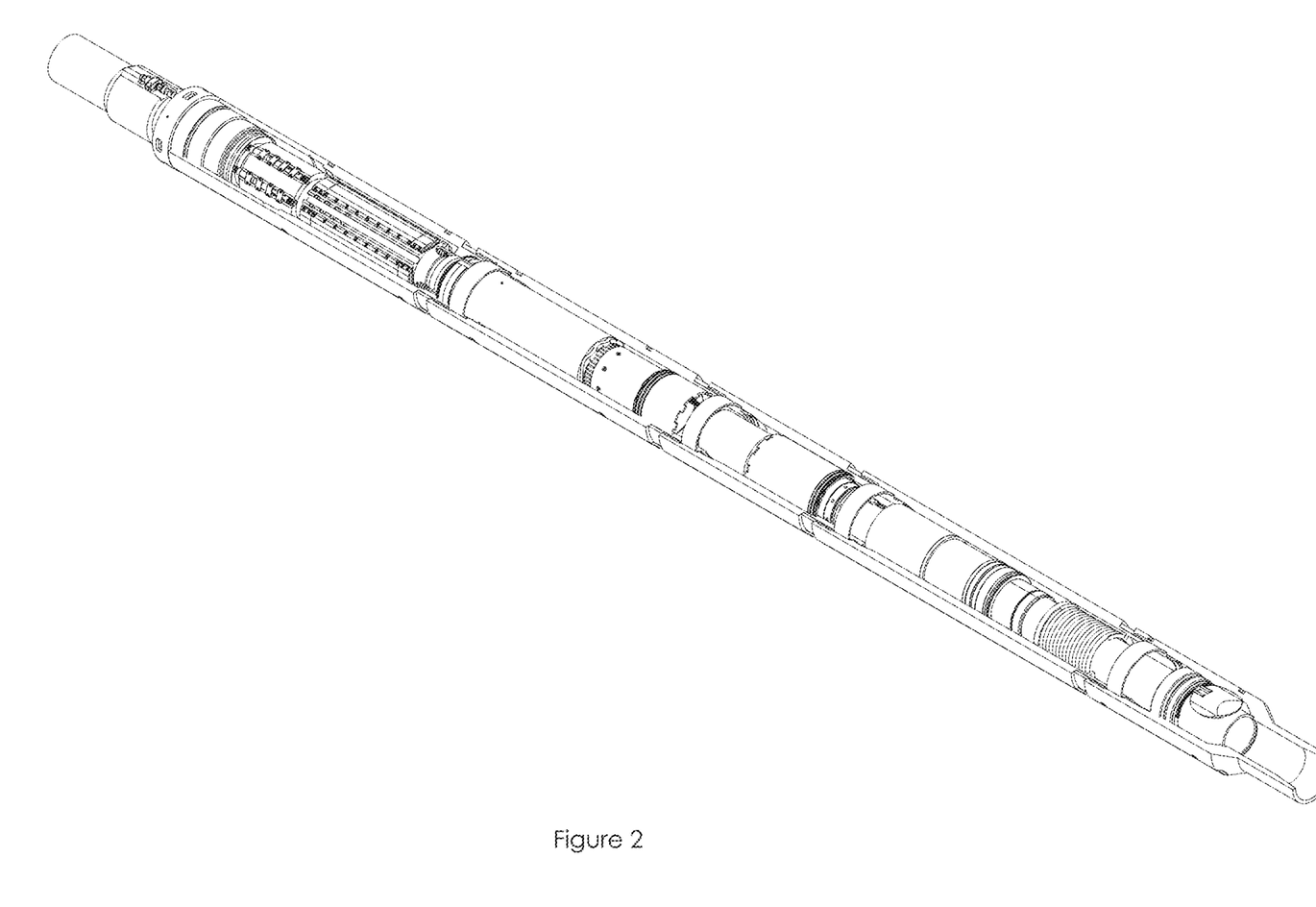
FIG. 2 illustrates a perspective view of a subsurface safety valve incorporating the electromagnetic-mechanical locking of the present invention, in the open position.
Figure 3:
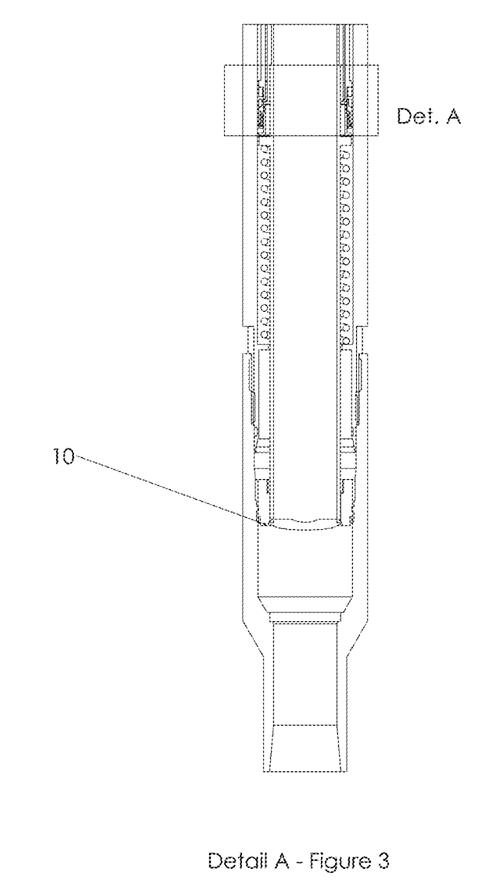
FIG. 3 illustrates a longitudinal side view of a subsurface safety valve incorporating the electromagnetic-mechanical locking of the present invention, in the closed position.
Figure 4:
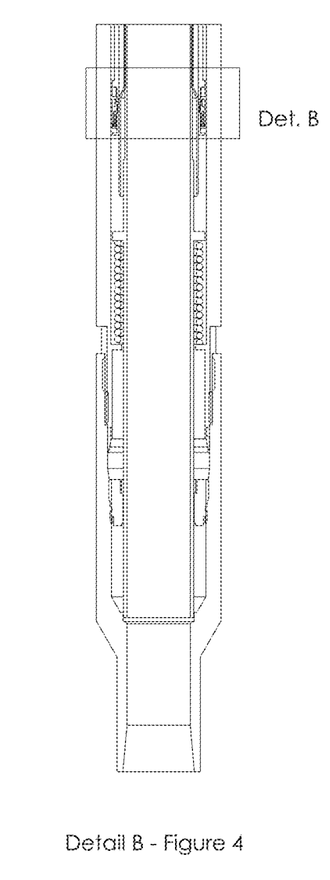
FIG. 4 illustrates a partial longitudinal cut side view of a subsurface safety valve incorporating the electromagnetic-mechanical locking of the present invention, in the open position.
Figure 5:
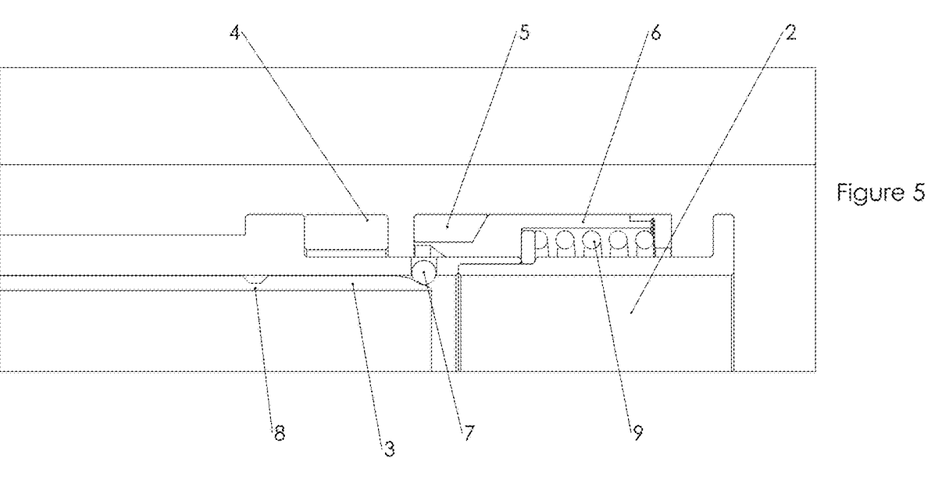
FIGS. 5 to 8 illustrate in detail the activation of the electromechanical coupler responsible for the electromagnetic-mechanical locking of the present invention, from the unlocked condition (Detail A of FIG. 3) to the locked condition (Detail B of FIG. 4).
Figure 6:
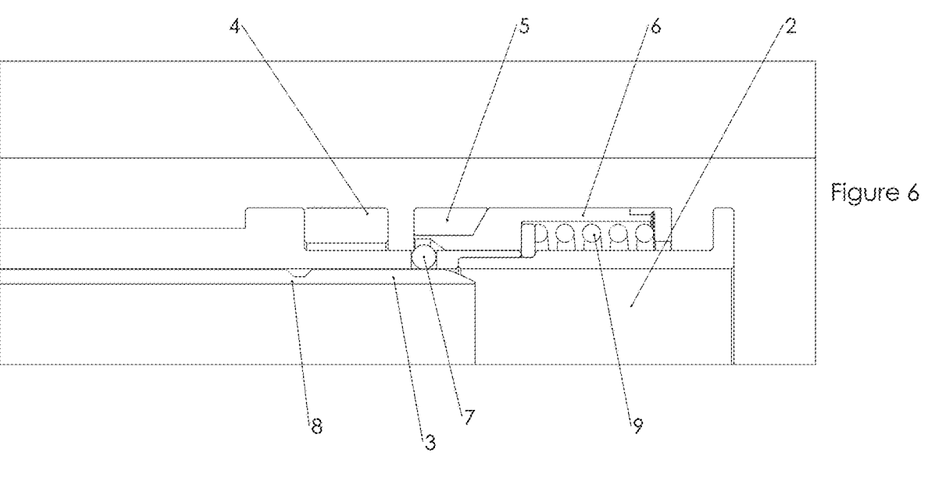
Figure 7:
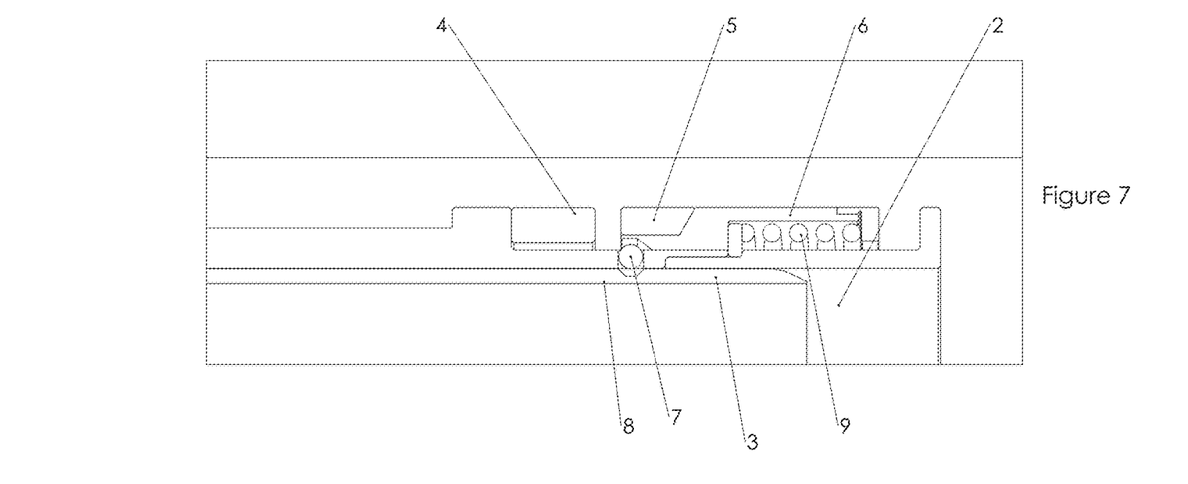
Figure 8:
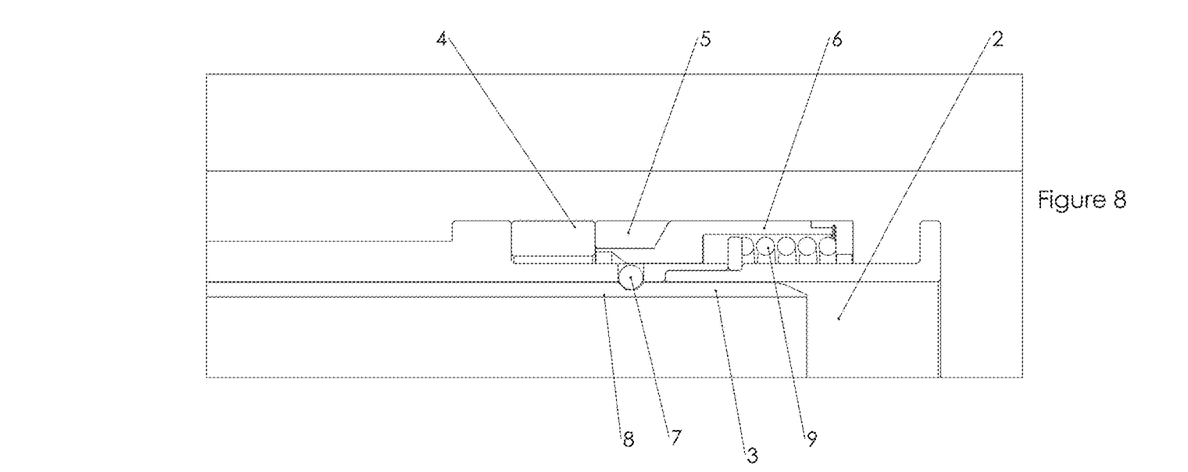

The present invention is directed to a subsurface safety valve, actuated by a hollow shaft motor, having its main application in production operations (completion) in oil and gas wells, land or maritime, producers or injectors, surgent or not.

Advantageously, the locking means of the subsurface safety valve is electromagnetic-mechanical.

The application of the locking means of a subsurface safety valve according to the present invention is not limited to opening and closing equipment, such as valves, and can be applied to other components of the completion tubing.

The invention will be described below by reference to the accompanying drawings.

The electromagnetic-mechanical locking of the subsurface safety valve of the present invention incorporates an electromagnetic-mechanical coupler that, when energized, allows the axial movement of the sleeve (2), generated by the rotating movement of the hollow shaft electric motor (not illustrated), to be transmitted to the flow tube (3).

This electromagnetic-mechanical coupler is composed of electromagnet (4), located at one end of the sleeve (2), which, when activated, approximates an adjacent ferromagnetic bulkhead (5), in solidarity to the mobile part (6), which leads to at least one locking element (7), which can be at least one sphere, and a locking element of varied geometry can also be used, provided that it is suitable for this purpose, to fit at least one cavity (8) provided for in the flow tube (3), which will have geometry compatible with the locking element employed.

The electromagnetic-mechanical coupler allows the axial movement of the flow tube (2), generated by the rotating movement of the hollow shaft electric motor, to be transmitted to the flow tube (3), compressing the spring (9) coupled to the mobile part (6), promoting force contrary to the opening of the flow shutter (10) of the valve.

This axial movement of the flow tube (3) promotes the opening of the flow shutter (10) of the valve, and for rapid closure thereof, in case of failure or need to close the well, the electromagnet (4) is de-energized, with the removal of the ferromagnetic bulkhead (5) from the electromagnet by the action of the spring (9) that acts on the mobile part (6), promoting the uncoupling of locking element (7) from the cavity (8) of the flow tube (3), and the consequent shifting thereof to the initial position, providing safe closure of the flow shutter (10) of the valve.

The invention claimed is:

1. An electromagnetic-mechanical locking device applied to a subsurface safety valve, incorporating an electromagnetic-mechanical coupler, comprising:
   an electromagnet (4), located at one end of a sleeve (2), ferromagnetic bulkhead (5), adjacent to said electromagnet and in solidarity to a mobile part (6), and locking element (7) that fits into a cavity (8) provided in a flow tube (3);
   said electromagnetic-mechanical coupler allowing the axial movement of the sleeve (2), generated by an electric motor with a hollow shaft having rotary movement, to be transmitted to the flow tube (3), compressing a spring (9) coupled to the mobile part (6); and
   a flow shutter (10), said compressing spring promoting force contrary to the opening of the flow shutter of the valve.

2. The electromagnetic-mechanical locking device according to claim 1 comprising more than one locking element (7).

3. The electromagnetic-mechanical locking device according to claim 1 comprising a locking element (7) of varied geometry.

4. The electromagnetic-mechanical locking device according to claim 1, the flow tube cavity (8) can be in number and geometry compatible with the locking element (7) adopted.

5. The electromagnetic-mechanical locking device according to claim 1, further comprising:
   an actuation system and a flow control system;
   when activated, the electromagnetic-mechanical coupler promotes the coupling between the actuation system and the flow control system.

6. The electromagnetic-mechanical locking device according to claim 5, said actuation system comprises the electric motor with the hollow shaft mechanically connected to the sleeve (2).

7. The electromagnetic-mechanical locking device according to claim 5, further comprising: a return device of the subsurface safety valve; the flow control system comprising the flow tube (3) and the flow shutter, which act together with the return device of the subsurface safety valve.

8. The electromagnetic-mechanical locking device according to claim 1, wherein a force exerted by the electromagnet (4) to keep the subsurface safety valve in an open position shifts the ferromagnetic bulkhead and compresses the spring (9).

9. The electromagnetic-mechanical locking device according to claim 1, to keep the subsurface safety valve in an open position with power, the electromagnet power (4) is residual.

10. The electromagnetic-mechanical locking device according to claim 7, the return device of the subsurface safety valve does not influence a force exerted by the electromagnet (4).

11. The electromagnetic-mechanical locking according to claim 1, when the electromagnet (4) is de-energized, the ferromagnetic bulkhead (5) moves away, by action of the spring (9), from the mobile part (6), uncoupling the locking element (7) from the cavity (8) of the flow tube (3), which moves to an initial position, by action of a return device of the subsurface safety valve, closing the flow shutter (10).

\* \* \* \* \*